US00RE34426E

United States Patent [19]

Weaver et al.

[11] E Patent Number: Re. 34,426

[45] Reissued Date of Patent: Nov. 2, 1993

[54] DISPENSING TOOL ASSEMBLY FOR CHARGING A REFRIGERANT INTO A SYSTEM

[75] Inventors: Kim A. Weaver, Springboro; James M. Jones, Dayton, both of Ohio

[73] Assignee: Production Control Units, Inc., Dayton, Ohio

[21] Appl. No.: 768,022

[22] Filed: Sep. 30, 1991

Related U.S. Patent Documents

Reissue of:

[64] Patent No.: 4,805,417
Issued: Feb. 21, 1989
Appl. No.: 116,961
Filed: Nov. 5, 1987

[51] Int. Cl.[5] ..... F25B 45/00

[52] U.S. Cl. ..... 62/292; 137/614; 137/614.04; 141/66; 141/302

[58] Field of Search ..... 62/77, 292; 222/255, 222/626; 141/1, 65, 66, 302, 383; 137/614, 614.04, 614.05, 614.06

[56] References Cited

U.S. PATENT DOCUMENTS

| | | | |
|---|---|---|---|
| 2,462,642 | 2/1949 | Jacobson et al. | 141/65 X |
| 2,887,124 | 4/1959 | Mehl | 137/614.06 |
| 3,538,961 | 11/1970 | Bruce | 62/292 X |
| 3,976,110 | 8/1976 | White | 137/614.05 X |
| 4,032,041 | 6/1977 | Bruce | 222/14 |
| 4,561,264 | 8/1985 | Johansson | 62/292 |
| 4,708,175 | 1/1987 | Janashak et al. | 141/1 |

*Primary Examiner*—William E. Tapolcai
*Attorney, Agent, or Firm*—Jacox & Meckstroth

[57] ABSTRACT

A tubular body supports a fluid actuated tubular piston connected to operate a coupling mechanism for releasably securing the body to a valve fitting on a refrigerant receiving system. The body encloses components which define a center passage connected to the fitting for first evacuating air from the system and then for directing liquid refrigerant into the system. The passage receives an elongated valve opening member which is fluid actuated to a position opening the valve fitting, and a movable valve member closes the passage to the flow of refrigerant. The fluid actuated coupling mechanism provides for convenient and simple insertion of the tool assembly onto the fitting with no insertion force and also for automatic release of the tool assembly from the fitting after charging is completed. A fluid actuated valve member minimizes the volume of residue refrigerant which vaporizes when the tool assembly is removed from the fitting.

19 Claims, 3 Drawing Sheets

DISPENSING TOOL ASSEMBLY FOR CHARGING A REFRIGERANT INTO A SYSTEM

Matter enclosed in heavy brackets [ ] appears in the original patent but forms no part of this reissue specification; matter printed in italics indicates the additions made by reissue.

BACKGROUND OF THE INVENTION

In equipment for charging a liquid refrigerant into a refrigeration or air conditioning system, for example, as disclosed in U.S. Pat. No. 3,538,961 and No. 4,032,041, and particularly in equipment for charging air conditioning systems for motor vehicles on an assembly line, it is common to couple the system first to a vacuum pump unit and then to a liquid refrigerant dispensing unit. The vacuum pump is used to evacuate air from the system after which the liquid refrigerant is dispensed or charged into the system to a predetermined volume.

As disclosed in above U.S. Pat. No. 3,538,961, a suction line and a liquid refrigerant dispensing or charging line are coupled to the system with manually actuated quick-connect couplings each of which encloses a valve member or element movable from a normally closed position to an open position when the coupling is attached to a male process fitting having an internal check or stem valve and connected to the system. In more recent years, both the suction line and the refrigerant supply line are connected by a single coupling which connects with a single valve fitting on the system. The system is first evacuated through the fitting and coupling and then the liquid refrigerant is charged into the system through the fitting. The single quick-connect coupling is particularly desirable in an automotive production line since less time is required to connect and disconnect one coupling in place of two couplings.

In an automotive production line, it has been found desirable for the quick-connect coupling to be attached or connected to the process fitting with a minimum time and effort and also for the coupling to be automatically disconnected from the fitting after the system has been charged with refrigerant. It has also been found desirable for the coupling to be compact in size and to be quickly connectable to the process fitting without requiring precise alignment between the coupling and the fitting. These desirable features minimize the operator's time and eliminate the need for the operator to disconnect the coupling from the fitting at the end of the charging cycle. It has also been found important to minimize the release of refrigerant vapor or gas when the coupling is disconnected from the valve fitting.

SUMMARY OF THE INVENTION

The present invention is directed to an improved dispensing tool assembly which provides all of the desirable features mentioned above, and particularly for quickly and conveniently connecting and disconnecting an evacuation line and a refrigerant supply or charging line to a refrigerant system. More specifically, the invention is directed to a dispensing tool assembly which may be connected to a process fitting on the system with no significant insertion force or effort and which automatically releases from the fitting after the charging cycle is completed.

The dispensing tool assembly of the invention also provides for automatically closing the refrigerant supply passage adjacent the fitting when the charging cycle is completed so that no significant volume of liquid refrigerant vaporizes into the air when the tool assembly is removed from the fitting. In addition, the dispensing tool assembly of the invention provides for a fitting seal which becomes tighter as the pressure of the liquid refrigerant increases and for eliminating the need for precision alignment with the fitting during the coupling and uncoupling operations. The dispensing tool assembly of the invention further provides the manually disconnecting the tool assembly from the fitting and for positive ejection of the tool assembly from the fitting.

Other features and advantages of the invention will be apparent from the following description, the accompanying drawings and the appended claims.

DESCRIPTION OF THE PREFERRED EMBODIMENTS

Figure 1:
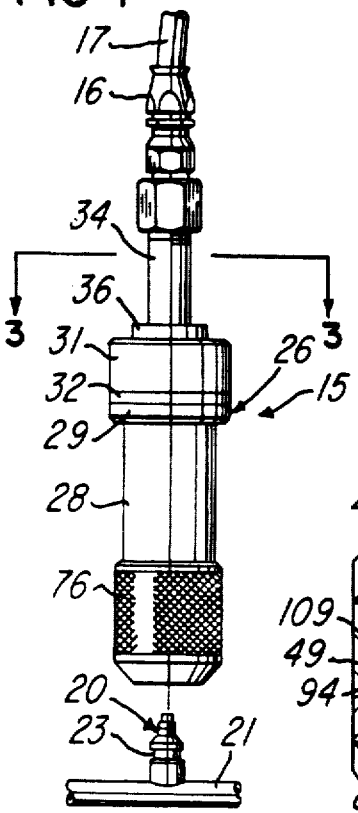
FIG. 1 is an elevational view of a dispensing tool assembly constructed in accordance with one embodiment of the invention.

The dispensing tool assembly 15 shown in FIG. 1 is connected by a fitting 16 and flexible high pressure hose 17 to refrigerant charging equipment or apparatus, similar to that disclosed in above mentioned U.S. Pat. No. 3,538,961 and the tool assembly 15 replaces the quick-connect couplings 31 and 34 shown in the patent. The tool assembly 15 is adapted to receive a conventional tubular valve fitting 20 which projects from a tank or line 21 forming part of an air conditioning system for a motor vehicle and which is first evacuated and then charged with liquid refrigerant through the tool assembly 15. The fitting 20 has an external groove 23 and an internal spring biased valve stem member or element 24.

Figure 2:
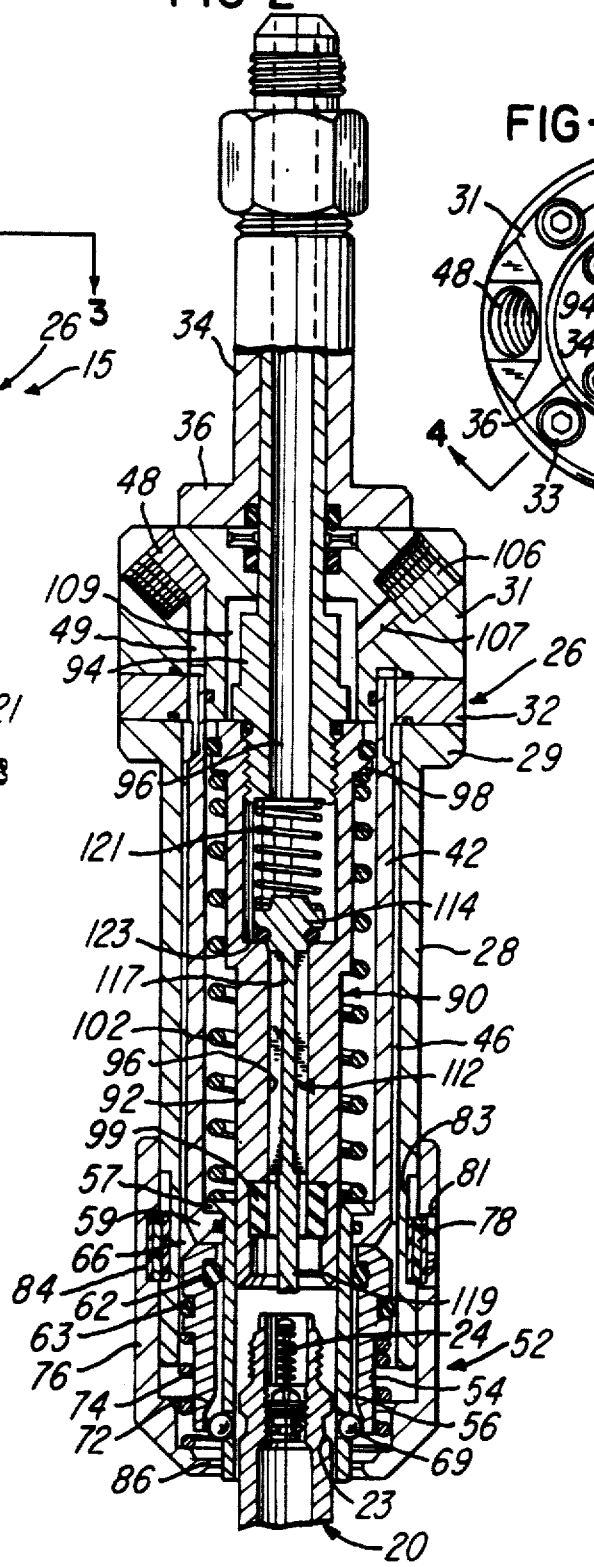
FIG. 2 is an axial section of the tool assembly shown in FIG. 1 as it is being inserted onto a fitting of a refrigerant system.
Figure 3:
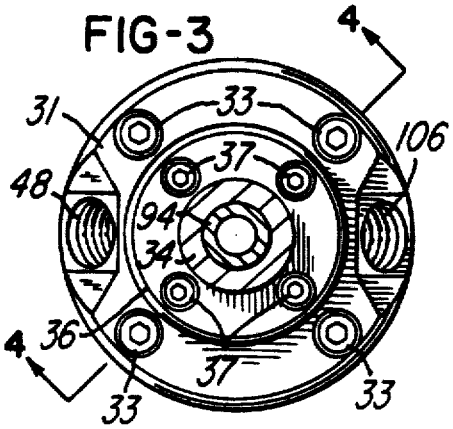
FIG. 3 is a section taken generally on the line 3—3 of FIG. 1.

Referring to FIG. 2, the tool assembly 15 includes a tubular body 26 having a generally cylindrical outer portion or section 28 with an outwardly projecting top flange 29 connected to a head portion 31 and a disk portion 32 by peripherally spaced screws 33 (FIG. 3). A tubular fitting 34 has a bottom flange 36 which is connected to the head portion 31 by a set of screws 37 (FIG. 3). The outer section 28 of the body 26 surrounds an inner generally cylindrical portion or section 42 which is spaced from the outer section 28 by upper and lower sets of circumferentially spaced ribs (not shown) to define an annular fluid passage 46 between the cylindrical sections 28 and 42. Pressurized actuating air is supplied to the passage 46 through an air actuating line (not shown) connected to an internally threaded port 48 and through a connecting passage 49 formed within the upper portions 31 and 32 of the body 26.

The lower portion of the tubular body 26 supports a coupling assembly 52 which includes a tubular piston 54 supported for axial sliding movement within the outer cylindrical section 28 of the body 26. A cylindrical sleeve 56 extends through the piston 54 and has an upper flange 57 which engages an inwardly projecting flange 59 on the lower end of the inner cylindrical section 42 of the body 26. A set of resilient O-rings 62 and 63 form fluid-tight seals between the piston 54 and the sleeve 56 and outer body section 28, and other O-rings are used throughout the tool assembly and shown in FIGS. 2 and 4–6 but are not identified with reference numbers. The lower end flange portion 59 of the inner body section 42 cooperates with the upper portion of the piston 54 to define an annular fluid chamber 66 which receives pressurized air through the passage 46 to move the piston 54.

The sleeve 56 has an inner diameter slightly larger than the outer diameter of the fitting 20, and the lower end portion of the sleeve has a series of circumferentially spaced holes which retain corresponding balls 69. An annular tapered surface 72 is formed within the lower end portion of the piston 54 and is effective to cam the balls 69 inwardly into the groove 23 of the fitting 20 when the piston 54 moves downwardly from its retracted position (FIG. 2) to its extended position (FIG. 4) for locking the tool assembly 15 to the fitting 20. The piston 54 moves downwardly in response to pressurized air supplied to the port 48, and a compression coil spring 74 returns the piston 54 to its retracted position when the pressurized air is released.

Figure 4:
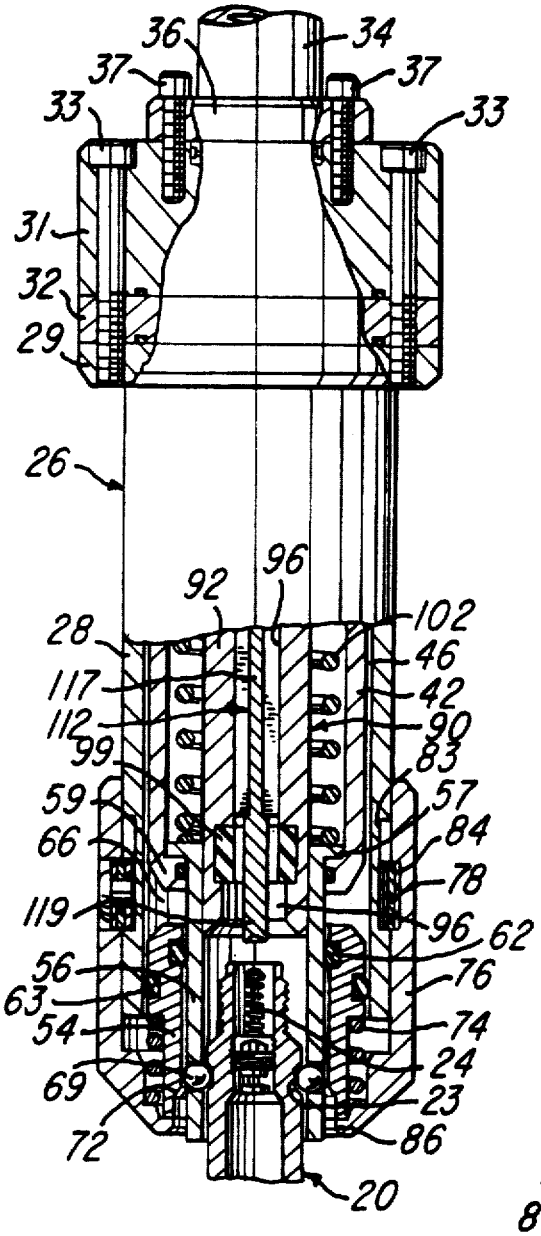
FIG. 4 is a fragmentary axial section similar to FIG. 2 and illustrating the tool assembly after it is coupled to the fitting.

The spring 74 extends between a flange on the piston 54 and the lower end portion of a tubular collar 76 slidably supported by the outer cylindrical section 28 of the body 26. The collar 76 has a knurled outer surface and is retained on the outer section 28 by a series of flexible plastic strips 78 which are inserted through an opening 81 within the collar 76. The strips are confined within opposing annular grooves 83 and 84 within the body section 28 and collar 76 respectively. The axial width of the groove 83 is greater than the width of the groove 84 so that the strips 78 may travel upwardly within the groove 83 when the collar 76 is manually retracted upwardly against the force of the spring 74. As shown in FIG. 4, when the piston 54 is extended to its ball locking position, the lower end of the piston engages and inwardly projecting annular lip 86 on the bottom end of the collar 76.

Figure 5:
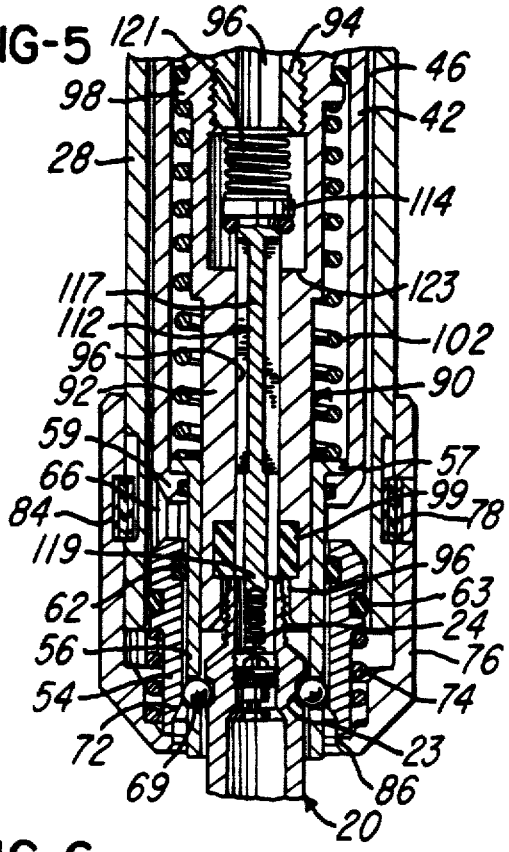
FIG. 5 is a fragmentary axial section similar to FIG. 4 and illustrating the tool assembly during the evacuation and charging operations.
Figure 6:
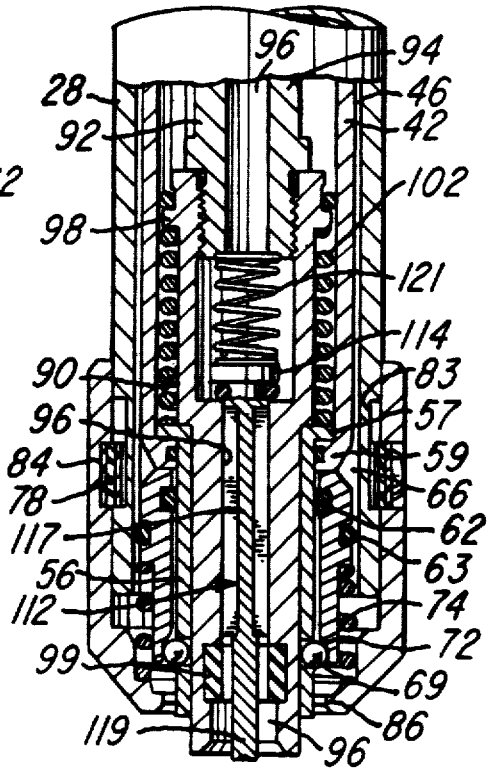
FIG. 6 is a fragmentary section similar to FIG. 5 and showing the tool assembly after ejection from the fitting.
Figure 7:
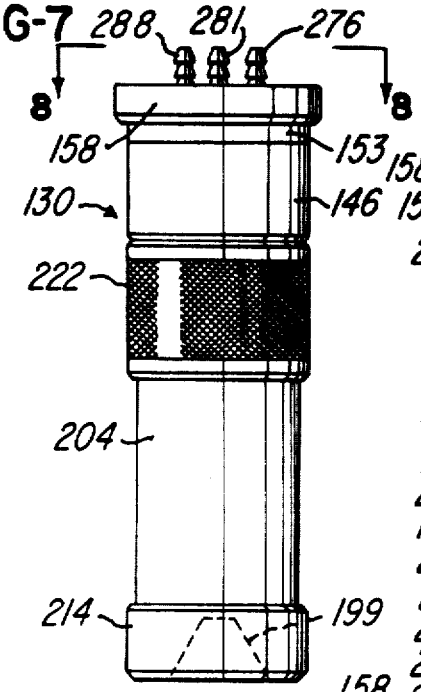
FIG. 7 is an elevational view of a dispensing tool assembly constructed in accordance with another embodiment of the invention.
Figure 8:
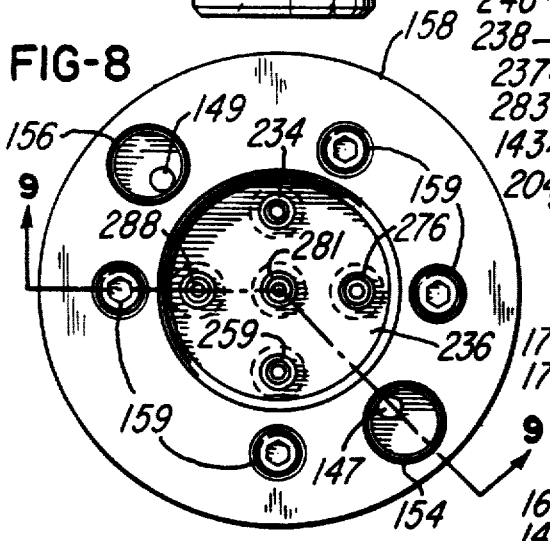
FIG. 8 is an enlarged plan view taken generally on the line 8—8 of FIG. 7.
Figure 10:
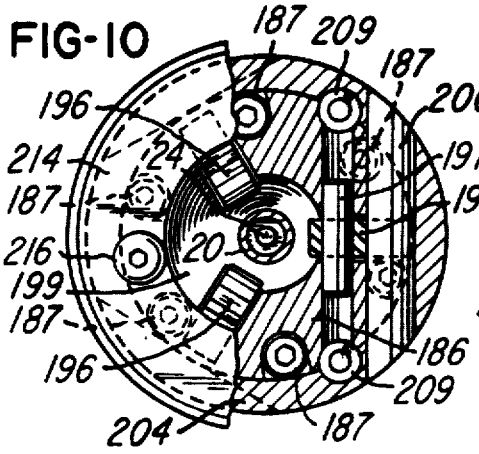
FIG. 10 is a section taken generally on line 10—10 of FIG. 9.

A tubular sealing piston assembly 90 is supported within the body 26 and fitting 34 for axial movement between a retracted position (FIG. 2) and a fully extended position (FIG. 6) and includes a tubular lower portion 92 threadably connected to a tubular upper portion 94. The portions 92 and 94 define an internal axially extending passage 96, and a resilient O-ring is carried by the lower piston portion 92 above a flange 98 and forms a fluid-tight seal with the inner section 42 of the body 26. A resilient rubber-like tubular band or seal 99 is carried by the lower piston portion 92 and, as shown in FIG. 5, engages the upper end surface of the fitting 20 when the piston assembly 90 is partially extended to form a fluid-tight seal between the piston assembly and the fitting. The piston assembly 90 is normally in its retracted position (FIG. 2) due to the force exerted by a compression spring 102 which extends between the upper flange 57 of the sleeve 56 and the outwardly projecting flange 98 on the lower piston portion 92. The piston assembly 90 is shifted to its extended position in response to pressurized air supplied through a line connected to a threaded port 106 within the head portion 31 of the body 26 and connected by a passage 107 to an annular chamber 109 surrounding the upper portion 94 of the piston assembly.

An elongated valve member 112 is supported within the passage 96 of the piston assembly 90 and includes a closure or head portion 114 which carries a resilient O-ring and is connected to a guiding stem portion 117 having a cross-sectional configuration in the shape of a cross. A cylindrical portion 119 projects downwardly from the stem portion 117 and is adapted to engage and open the valve stem assembly 24 within the fitting 20 (FIG. 5) when the piston assembly is partially extended. A compression spring 121 normally urges the head portion 114 to a closed position where the O-ring engages an internal annular shoulder or seat 123 within the piston portion 92 to form a fluid-tight seal.

In operation of the dispensing tool assembly 15 described above in connection with FIGS. 1–6, the tool assembly shown in FIG. 1 is normally supported and counter balanced by a cable extending from a spring loaded reel (not shown) positioned along an assembly line for motor vehicles. The operator lowers the tool assembly 15 onto the fitting 20, and no resistance or insertion force is required since the balls 69 are retracted as shown in FIG. 2. After the fitting 20 is inserted into the tool assembly 15 (FIG. 2), pressurized air is supplied through the line connected to the port 48 to extend the ball retaining piston 54 against the spring 74 and to cam the balls 69 into the groove 23 (FIG. 4) so that the coupling assembly 52 positively locks the tool assembly 15 to the fitting 20.

Pressurized air is then supplied through the line connected to the port 106 for moving the piston assembly 90 to its partially extended position (FIG. 5) where the resilient seal 99 engages the upper end surface of the fitting 20. When the piston assembly 90 moves to this sealing position, the cylindrical portion 119 of the valve opening member 112 depresses the valve stem assembly 24 of the fitting 20 to its open position within the fitting. When the valve stem assembly 24 is opened, it stops further movement of the valve opening member 112 so that further movement of the piston assembly 90 moves the closure portion 114 to an open position. The system is first evacuated by connecting the passage 96 and the hose 17 to a vacuum or suction pump after which a predetermined volumn of liquid refrigerant is dispensed or charged into the system 21 also through the passage 96. Since the upper end of the upper piston portion 94 is exposed to the refrigerant, an increase in pressure of the refrigerant increases the pressure of the seal 99 against the fitting 20 to provide a tighter seal.

After the refrigerant receiving system is fully charged, the pressurized air supplied to the port 48 is released so that the piston 54 returns to its retracted position by the spring 74 to release the balls 69 from within the groove 23 of the fitting 20. The continued air pressure within the chamber 109 moves the piston assembly 90 further downwardly within the sleeve 56 to its fully extended position (FIG. 6) so that the tool assembly 15 is moved upwardly from the fitting 20 by pushing the fitting 20 out of the sleeve 56.

As apparent from FIG. 4, the tool assembly 15 may be manually removed from the fitting 20 at any time during the evacuating and charging cycle simply to pulling upwardly on the collar 76 which shifts the piston 56 upwardly to release the balls 69 from engagement with the fitting 20. However, the automatic release and ejection of the tool assembly 15 from the fitting 20 by releasing the air pressure within the passage 49 while maintaining the pressure within the passage 107, is preferred since it does not require operator assistance to remove the tool assembly from the fitting. The upward tension on the tool assembly 15 by the counter balancing cable reel, is effective to lift the tool assembly from the fitting after the coupling assembly 52 is returned to its released position.

Figure 9:
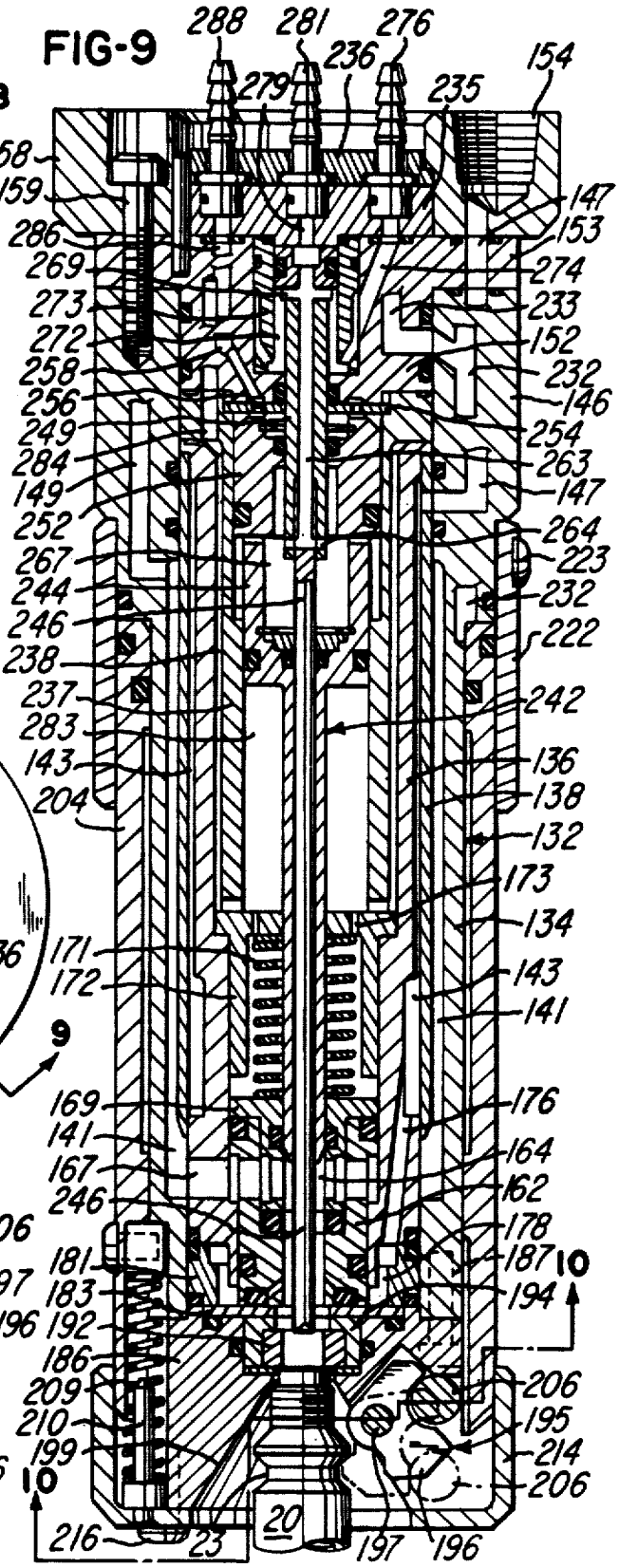
FIG. 9 is an enlarged axial section of the tool assembly as taken generally on the line 9—9 of FIG. 8.

Referring to FIGS. 7-10 which illustrte another embodiment of a dispensing tool assembly 130 constructed in accordance with the invention, a tubular body 132 includes a tubular outer section 134, a tubular inner section 136 and a tubular intermediate section 138. An annular suction passage 141 is defined between the sections 134 and 138, and another annular refrigerant supply passage 143 is defined between the sections 136 and 138. The outer section 134 includes a larger upper portion 146 which has an axially extending passage 147 connected to the annular passage 143. Another axially extending passage 149 is formed within the upper portion 146 and connects with the annular passage 141. An annular closure or plug member 152 extends into the upper portion 146 of the body section 134 and has a flange portion 153 defining extensions of the passages 147 and 149 which continue to corresponding internally threaded ports 154 and 156 (FIGS. 8 & 9) formed within an annular cap member 158 secured to the outer body section 134 by a set of screws 159 (FIG. 9).

The lower end portion of the inner body section 136 receives an annular valve member 162 which defines a center passage 164 connected to the passage 141 by a radially extending passage 167 extending through the member 162, the lower end portion of the inner body section 136 and also through an annular plug member 169 projecting into the member 162. A pair of resilient O-rings form fluid-tight seals between the member 162 and the inner body section 136, and another pair of O-rings surround the passage 164 and are confined between the plug members 162 and 169. The member 162 and 169 are normally urged downwardly by a compression spring 171 within a retention sleeve 172 having small holes 173.

A passage 176 extends diagonally through the lower end portion of the inner body section 136 and connect the annular passage 143 to an annular chamber 178 defined by the lower end surface of the inner body section 136 and an insert ring 181 confined within the lower end portion of the outer body section 134. A washerlike closure plate 183 is secured to the lower end surface of the members 162 and 181 and is retained by an annular coupling fitting or member 186 secured to the lower end portion of the outer housing section 134 by a three peripherally spaced screws 187. A series of resilient O-rings are shown in FIG. 9 for forming fluid-tight seals between the annular members 162, 181, plate 183 and coupling member 186.

The coupling member 186 also supports a resilient sealing tube or ring 192 which is confined within a surrounding cup member 194 which is mounted within a counterbore in the member 186. The resilient ring 192 is adapted to engage and form a fluid-tight seal with the upper end surface of valve fitting 20 projecting from the refrigerant receiving system (not shown).

The annular coupling fitting or member 186 is part of a coupling mechanism or coupler 195 which includes a set of three circumferentially spaced locking dogs 196 each pivotally supported within a corresponding a radial slot within the member 186 by a cross pin 197. The member 186 has a tapered or frusto-conical end surface 199 which is interrupted by the slots, and the dogs 196 pivot between retracted positions (FIG. 8) and inwardly extended locked positions (dotted lines) where the dogs 196 engage the fitting 20 within the groove 23. The dogs 196 are shifted between their retracted and locked positions in response to axial movement of a cylindrical or tubular piston 204 slidably supported on the outer body section 134.

The lower end portion of the piston 204 receives the end portions of the cylindrical cross pins 206 (FIG. 10) which engage the does 196 for moving the dogs. The tubular piston 204 is urged to its normally retracted position (FIG. 8), where the dogs 196 are retracted, by the force exerted by a set of three circumferentially spaced compression springs 209 (FIG. 10) mounted on corresponding axially extending guide pins 210 supported by the base coupling member 186. An annular collar 214 surrounds the lower end portion of the tubular piston 204 and is secured to the coupling member 186 by peripherally spaced screws 216.

A cylindrical sleeve 222 surrounds the upper end portion of the tubular piston 204 and is secured to the upper end portion 146 of the outer body section 134 by a set of peripherally spaced screws 223. A set of O-rings are carried by the upper end portion of the piston 204 to form fluid-tight seals between the piston and the outer body section 134 and sleeve 222. An axially extending passage 232 is formed within the upper end portion 146 of the outer body section 134 and connects with a passage 233 formed within the members 152 and extending to an air hose fitting 234 (FIG. 8) to direct pressurized air to the upper end of the tubular piston 204. The fitting 234 is inserted within a disc 235 and is retained by a plate 236 confined within the annular cap member 158.

A tubular liner or cylinder member 237 extends into the upper end portion of the inner body section 136 and is spaced by ribs to define an annular fluid or air receiving chamber 238. A tubular valve member 242 has an enlarged head portion 244 slidably supported within the cylinder member 237. The lower end portion of the valve member 242 extends into the center passage 164 defined within the member 162 and 169 and has a tapered lower end surface. The valve member 242 is supported for axial movement as a double-acting piston, and an elongated valve stem opening pin or member 246 is axially movable within the tubular valve member 242. The opening pin or member 246 has a slightly larger tubular upper end portion 249 which extends through resilient O-ring confined within the member 152 and an annular piston 252 supported for axial movement within an upper end portion of the liner member 237.

A washer-like plate 254 is confined within a counterbore within the upper end portion of the liner member 237 and has a hole 256 which communicates with a passage 258 within the plug member 152 for receiving pressurized air through a line connected to a hose receiving fitting 259 (FIG. 8) for actuating the piston 252.

The upper portion 249 of the valve member 246 has an internal passage 263 which is connected by a cross hole 264 to a fluid chamber 267 within the upper end portion 244 of the valve piston 242 and within the lower end portion of the piston 252.

Pressurized fluid or air is supplied to the passage 263 and chamber 267 through a cross hole 269 within the upper end portion 249 of the valve opening member 246. The port 269 is connected to an annular chamber 272 within a sleeve 273, and the chamber 272 receives pressurized fluid or air through an inclined passage 274 within the plug member 152 and connected to a hose fitting 276 within the disc 235. A passage 279 is formed within the center of the disc 235 and receives pressurized fluid or air from a supply line connected to a center fitting 281 for pressurizing the upper end of the valve opening member 246. The annular passage 238 is connected at the bottom end of the sleeve 237 to a chamber 283 located below the head portion 244 of the valve member 242, and the chamber 283 is connected to the chamber within the sleeve 172 by the ports 173. The passage 238 and chamber 283 are connected by passages 284 and 286 to a hose receiving fitting 288 within the disc 235.

In operation of the tool assembly described in connection with FIGS. 7-10, the tool assembly is supported in the same manner as described above for the tool assembly 15, that is, by suspending the tool assembly with a cable depending from a counter-balancing reel (not shown). The tool assembly 130 is lowered onto the fitting 20 projecting from the refrigerant receiving system, and the coupler 195 is actuated by extending the tubular piston downwardly with pressurized air directed to the upper end of the piston through the passages 232 and 233 and the fitting 234. When the piston 204 moves downwardly, each of the dogs 196 pivots inwardly to its lock position as shown by the dotted lines in FIG. 8. When the dogs 196 engage the fitting 20, the upper end of the fitting compresses against the resilient sealing ring 192 to form a fluid-tight connection between the passage 164 and the passage within the fitting 20.

After the coupling assembly 130 is positively attached to the fitting 20, pressurized air is supplied through the center fitting 281 to shift the opening member 246 downwardly to open the stem valve within the fitting 20 when the upper enlarged head portion of the member 246 bottoms on the plug member 152. With the fitting open, the refrigerant receiving system is evacuated by a suction applied to the passages 164, 167 and 141 and through the passage 149 and a suction line (not shown) connected to the threaded port 156 within the top cap ring 158. After the system is evacuated, pressurized air is introduced through the passage 258 and fitting 259 to shift the piston 252 and the piston head portion 244 of the valve member 242 downwardly until the piston 252 bottoms within the counterbore in the liner sleeve or cylinder 237. This first step downward movement of the piston head portion 244 with the piston 252 causes the valve member 242 to close the suction passage 167 with the valve member engaging the surrounding O-rings.

After the suction passage 167 is closed by the valve member 242, the pressure of the liquid refrigerant within the annular passage 143 is increased from its normal pressure of about 100 p.s.i. to a pressure of about 600 p.s.i. This higher pressure of the refrigerant within the chamber 178 is effective to raise the valve member 162 to a slightly elevated position against the compression spring 171 until the plug member 169 engages the lower end of the sleeve 172 within the inner body section 136. When the valve member 162 raises in response to the higher refrigerant pressure, the liquid refrigerant flows through the chamber 178 into the passage 164 and into the refrigerant receiving system through the open fitting 20.

After a predetermined charge of refrigerant is dispensed into the refrigerant receiving system, the pressure of the refrigerant within the line connected to the port 154 is reduced back to about 100 p.s.i. The valve member 162 returns to its closed position by the compression spring 171 so that the flow of refrigerant is stopped. Pressurized air is then introduced through the fitting 276 and passages 274, 272, 269, 263 and 264 to the chamber 267 within the upper head portion 244 of the valve member 242. This causes the valve member 242 to move downwardly through a second step until the head portion 244 bottoms on the sleeve 172 within the inner body section 136. As the valve member 242 moves further downwardly within the passage 164, it displaces the remaining liquid refrigerant within the passage 164 into the system through the fitting 20.

While pressurized air continues to be supplied to the fitting 276 and passage 274, the pressurized air to the fitting 281 is released so that the valve opening member 246 returns to its fully retracted position (FIG. 9), thereby allowing the valve stem assembly 24 within the fitting 20 to close. After the fitting 20 is closed, pressurized air is supplied through the fitting 288 and passages 286, 284 and 238 to the chamber 283 below the head portion 244 of the valve member 242. This causes the valve member 242 to move upwardly to return the valve member 242 and the piston 252 to their fully retracted positions shown in FIG. 9.

When the valve stem opening member 256 and the valve member 242 are fully retracted (FIG. 9), the air pressure through the fitting 234 to the upper end of the piston 204 is released. The compression springs 209 return the piston 205 to its upper retracted position (FIG. 8) so that the dogs 196 are pivoted to their retracted positions to release the fitting 20 from the tool assembly 130. The upward tension on the tool assembly 130 by the counterbalancing reel, automatically raises the tool assembly to an elevated position where the tool assembly is returned to its home base ready for receiving another air conditioning system which requires charging.

From the drawings and the above description, it is apparent that a dispensing tool assembly constructed in accordance with the present invention, provides desirable features and advantages. For example, each of the tool assemblies 15 and 130 are inserted onto a fitting 20 without any significant inserting force. The tool assemblies then automatically lock onto the fitting 20 and automatically proceed with opening the valve stem within the fitting, evacuating the refrigerant receiving system, and directing a predetermined charge to liquid refrigerant into the system. After charging, the tool assembly provides for automatically closing the valve within the fitting 20, automatically shutting off the supply of liquid refrigerant and then for automatically releasing the tool assembly from the fitting without requiring any operator assistance. The tool assembly shown in FIGS. 7-10 also provides for inserting onto a fitting 20 without precise axial alignment as a result of the surface 199 and substantially removes all of the liquid refrigerant down to the fitting 20 so that nose of the refrigerant escapes as a vapor when the tool assembly 130 is uncoupled form the fitting 20.

While the forms of apparatus and methods herein described constitute preferred embodiments of the invention, it is to be understood that the invention is not limited to these precise forms of apparatus and methods, and that changes may be made therein without departing from the scope and spirit of the invention as defined in the appended claims.

The invention having thus been described, the following is claimed:

1. A dispensing tool assembly for connecting a refrigerant charging unit to a refrigerant receiving system having a tubular fitting with an internal movable valve element, said tool assembly comprising a tubular body having a center axis, means supported within said body and defining an axially extending fluid passage, means for selectively connecting a suction line and a refrigerant supply line to said passage, means forming a fluid-tight seal between said means defining said passage and the fitting, an elongated valve element opening member disposed within said passage for axial movement, first fluid actuating means for moving said valve element opening member between a retracted position and an extended position where the valve element within the fitting is moved to an open position, coupling means supported by said body for movement between a released position and a locked position positively connecting said body to the fitting, a piston supported by said body for axial movement between an extended position and a retracted position, means connecting said piston to said coupling means for moving said coupling means to said locked position in response to the application of a pressurized fluid to move said piston to said extended position means for moving said piston to said retracted position for moving said coupling means to said released position to provide for convenient coupling of said tool assembly to the fitting and automatic release of said tool assembly from the fitting after the receiving system has received a predetermined charge of refrigerant, a valve member supported within said means defining said fluid passage within said body, said valve member being movable between an open position allowing refrigerant to flow through said passage and a closed position, [and] fluid actuated means for moving said valve member between said open and closed positions, *and means for removing substantially all of the refrigerant within said fluid passage between said valve member and the fitting before removing said tool assembly from the fitting to prevent the refrigerant from escaping into the air surrounding said tool assembly.*

2. A tool assembly as defined in claim 1 wherein said piston is tubular and has an axis common with the center axis of said body, said coupling means including a plurality of circumferentially spaced movable gripping elements and supported to engage a shoulder on the tubular fitting, and means connecting said tubular piston to said gripping elements for moving said gripping elements into engagement with the fitting in response to movement of said tubular piston to said extended position.

3. A tool assembly as defined in claim 2 wherein said means for moving said piston to said retracted position comprise a compression spring for normally positioning said gripping elements of said coupling means in said released position to provide for inserting said tool assembly onto the fitting with minimal force.

4. A tool assembly as defined in claim 3 wherein said coupling means further include a support member supporting said gripping elements for relative movement, and said support member defines a tapering cavity for receiving the fitting to facilitate insertion of the tool assembly onto the fitting without requiring precise alignment between the fitting and said tool assembly.

5. A tool assembly as defined in claim 1 wherein said piston is tubular and surrounds said tubular body.

6. A tool assembly as defined in claim 1 wherein said means forming a fluid-tight seal comprise a resilient sealing ring surrounding said passage, and means supported by said body and retaining said sealing ring.

7. A tool assembly as defined in claim 1 wherein said valve member surrounds said valve element opening member and is movable axially thereon, resilient sealing means engaging said valve member and cooperating therewith to form a valve for controlling the flow of fluid within said passage, and fluid actuated means for moving said valve member on said valve element opening member.

8. A tool assembly as defined in claim 7 wherein said valve member is movable on said valve element opening member to a position adjacent said means forming a fluid-tight seal for minimizing the escape of refrigerant gas from said tool assembly after being removed from the fitting.

9. A dispensing tool assembly for connecting a refrigerant charging unit to a refrigerant receiving system having a tubular fitting with an internal movable valve element, said tool assembly comprising a tubular body having a center axis, means supported within said body and defining an axially extending fluid passage, means for selectively connecting a suction line and a refrigerant supply line to said passage, means forming a fluid-tight seal between said means defining said passage and the fitting, an elongated tubular valve member disposed within said passage for axial movement, an elongated valve element opening member disposed within said valve member for axial movement, first fluid actuating means for moving said valve element opening member between a retracted position and an extended position where the valve element within the fitting is moved to an open position, second fluid actuated means for moving said valve member on said valve element opening member to control the flow of fluid through said passage, coupling means supported by said body for movement between a released position and a locked position positively connecting said body to the fitting, a tubular piston supported by said body for axial movement between an extended position and a retracted position, means connecting said piston to said coupling means for moving said coupling means to said locked position in response to the application of a pressurized fluid to move said piston to said extended position, and means for moving said piston to said retracted position for moving said coupling means to said released position to provide for convenient coupling of said tool assembly to the fitting and automatic release of said tool assembly from the fitting after the receiving system has received a predetermined charge of refrigerant.

10. A tool assembly as defined in claim 9 wherein said coupling means include a plurality of circumferentially spaced gripping elements pivotally supported to engage a shoulder on the tubular fitting, and means connecting said tubular piston to said gripping elements for pivoting said gripping elements into engagement with the fitting in response to movement of said piston to said extended position.

11. A tool assembly as defined in claim 9 wherein said means for moving said piston to said retracted position comprise compression spring means for normally positioning said gripping elements of said coupling means in said released position to provide for inserting said tool assembly onto the fitting with minimal force.

12. A tool assembly as defined in claim 10 wherein said coupling means further include a support member supporting said gripping elements for said pivotal movement, and said support member defines a tapering cavity for receiving the fitting to facilitate insertion of the tool assembly onto the fitting without requiring precise alignment between the fitting and said tool assembly.

13. A tool assembly as defined in claim 9 and including an annular valve member surrounding said passage within said body, said valve member being movable between an open position allowing refrigerant to flow through said passage and a closed position, spring means urging said annular valve member to said closed position, and said annular valve member being movable to said open position in response to the pressure of the refrigerant.

14. A tool assembly as defined in claim 9 wherein said piston is tubular and surrounds said tubular body.

15. A tool assembly as defined in claim 9 and including a second piston supported within said body for moving said valve member, and means defining passages for directing fluid to move said piston and said valve member in both axial directions.

16. A tool assembly as defined in claim 9 wherein said tubular valve member is movable on said valve element opening member to a position adjacent said means forming a fluid-tight seal for minimizing the volume of refrigerant gas within said passage before said tool assembly is removed from the fitting.

17. A method of charging a liquid refrigerant into a refrigerant receiving system having a fitting with an internal valve element and with the use of a dispensing tool assembly having means defining an internal charging passage, comprising the steps of moving the tool assembly onto the fitting with the fitting in alignment with the charging passage, coupling the tool assembly to the fitting by moving a first fluid actuated piston forming part of the tool assembly, forming a fluid-tight seal between the fitting and the means defining the charging passage, opening the internal valve element within the fitting by moving an actuating member axially with a second fluid actuated piston within the tool assembly, connecting the charging passage to a suction line to evacuate air from the system through the fitting and the charging passage, connecting the charging passage to a refrigerant supply line to provide for charging liquid refrigerant into the system through the fitting, closing the passage by moving a valve member within the passage, closing the valve element within the fitting by moving the actuating member axially with the second fluid actuated piston, *removing substantially all of the liquid refrigerant within the charging passage between the valve member and the fitting before removing the tool assembly from the fitting to prevent the refrigerant from escaping into the air surrounding the tool assembly*, and decoupling the tool assembly from the fitting by moving the first actuated piston.

18. A method of charging a liquid refrigerant into a refrigerant receiving system having a fitting with an internal valve element and with the use of a dispensing tool assembly having means defining an internal charging passage, comprising the steps of moving the tool assembly onto the fitting with the fitting in alignment with the charging passage, coupling the tool assembly to the fitting by moving a fluid actuated piston forming part of the tool assembly, forming a fluid-tight seal between the fitting and the means defining the charging passage, opening the internal valve element within the fitting by moving an actuating member axially within the tool assembly, connecting the charging passage to a suction passage within the tool assembly to evacuate air from the system through the fitting and the charging passage, closing the suction passage within the tool assembly by moving a first valve member within the tool assembly, connecting the charging passage to a refrigerant supply passage by moving a second valve member within the tool assembly to provide for charging liquid refrigerant into the system through the fitting, closing the refrigerant supply passage by moving the second valve member within the tool assembly, displacing the liquid refrigerant within the charging passage by moving a member within the charging passage, closing the valve element within the fitting by moving the actuating member axially within the tool assembly, and decoupling the tool assembly from the fitting by moving the piston.

19. A dispensing tool assembly for connecting a liquid charging unit to a liquid receiving system having a tubular fitting with an internal movable valve element, said tool assembly comprising a tubular body having a center axis, means supported within said body and defining an axially extending fluid passage, means for selectively connecting a suction line and a liquid supply line to said passage, means forming a fluid-tight seal between said means defining said passage and the fitting, an elongated valve element opening member disposed within said passage for axial movement, first fluid actuating means for moving said valve element opening member between a retracted position and an extended position where the valve element within the fitting is moved to an open position, coupling means supported by said body for movement between a released position and a locked position positively connecting said body to the fitting, a piston supported by said body for axial movement between an extended position and a retracted position means connecting said piston to said coupling means for moving said coupling means to said locked position in response to the application of a pressurized fluid to move said piston to said extended position, means for moving said piston to said retracted position for moving said coupling means to said released position to provide for convenient coupling of said tool assembly to the fitting and automatic release of said tool assembly from the fitting after the receiving system has received a predetermined charge of liquid, a valve member supported within said means defining said fluid passage within said body, said valve member being movable between an open position allowing liquid to flow through said passage and a closed position, [and] fluid actuated means for moving said valve member between said open and closed positions, *and means for removing substantially all of the liquid within said fluid passage between said valve member and the fitting before removing said tool assembly from the fitting to prevent the liquid from escaping into the air surrounding said tool assembly.*

* * * * *